United States Patent
Kwon et al.

(10) Patent No.: US 9,769,282 B2
(45) Date of Patent: Sep. 19, 2017

(54) MOBILE TERMINAL FOR PERFORMING WEIGHT BASED FUNCTION WITH MILITARY PURPOSE AND CONTROL METHOD THEREOF

(71) Applicant: AGENCY FOR DEFENSE DEVELOPMENT, Yuseong-gu, Daejeon (KR)

(72) Inventors: Miyoung Kwon, Seoul (KR); Taein Kang, Seoul (KR); Hoonkyu Kim, Seoul (KR); Seongkee Lee, Seoul (KR); Ingyu Kim, Seoul (KR)

(73) Assignee: AGENCY FOR DEFENSE DEVELOPMENT, Yuseong-Gu, Daejeon (KR)

( * ) Notice: Subject to any disclaimer, the term of this patent is extended or adjusted under 35 U.S.C. 154(b) by 0 days.

(21) Appl. No.: 15/270,246

(22) Filed: Sep. 20, 2016

(65) Prior Publication Data
US 2017/0086068 A1    Mar. 23, 2017

(30) Foreign Application Priority Data
Sep. 21, 2015    (KR) .................. 10-2015-0133163

(51) Int. Cl.
*H04M 1/66*    (2006.01)
*H04L 29/08*    (2006.01)
(Continued)

(52) U.S. Cl.
CPC .......... *H04L 67/306* (2013.01); *H04L 63/105* (2013.01); *H04W 12/08* (2013.01);
(Continued)

(58) Field of Classification Search
CPC ..... H04W 12/06; H04W 12/08; H04W 88/02; H04L 67/306; H04L 67/42; H04L 63/0227
See application file for complete search history.

(56) References Cited

U.S. PATENT DOCUMENTS

| 2014/0157353 | A1* | 6/2014 | Shim ................. H04L 63/20 726/1 |
| 2016/0055344 | A1* | 2/2016 | Peterson ............ G06F 21/629 726/28 |
| 2016/0205139 | A1* | 7/2016 | Davies ............... H04L 63/20 726/1 |

FOREIGN PATENT DOCUMENTS

KR    20130134946 A    12/2013
KR    20150081187 A1    1/2014
(Continued)

OTHER PUBLICATIONS

Lim, J.W., et al., "Response technique for the vulnerability of broadcast intent security in android"; Korea Convergence Security Association, Dec. 2012, pp. 61-67. With English Abstract.

*Primary Examiner* — Barry Taylor
(74) *Attorney, Agent, or Firm* — Scully Scott Murphy and Presser

(57) ABSTRACT

A mobile terminal for performing a weight-based function with military purposes according to the present invention includes an interface unit configured to receive a control policy controlling intent, and information deciding a weight for the intent, and a controller configured to determine whether or not a use authority for the intent is provided, decide a weight based on the control policy and the information when the use authority is not provided, and execute one of a log generation, an immediate notification and a terminal lock by comparing the decided weight with a preset boundary value, whereby multiple stages of blocking levels
(Continued)

can be provided upon blocking intent, thereby allowing for setting access and blocking with respect to various users or applications.

6 Claims, 2 Drawing Sheets

(51) Int. Cl.
*H04W 12/08* (2009.01)
*H04W 88/02* (2009.01)
*H04W 12/06* (2009.01)
*H04L 29/06* (2006.01)

(52) U.S. Cl.
CPC .......... *H04L 63/0227* (2013.01); *H04L 63/30* (2013.01); *H04L 67/42* (2013.01); *H04W 12/06* (2013.01); *H04W 88/02* (2013.01)

(56) References Cited

FOREIGN PATENT DOCUMENTS

| KR | 101408276 B1 | 6/2014 |
| KR | 101531781 B1 | 6/2015 |

\* cited by examiner

MOBILE TERMINAL FOR PERFORMING WEIGHT BASED FUNCTION WITH MILITARY PURPOSE AND CONTROL METHOD THEREOF

CROSS-REFERENCE TO RELATED APPLICATION

Pursuant to 35 U.S.C. §119(a), this application claims the benefit of an earlier filing date of and the right of priority to Korean Application No. 10-2015-0133163, filed on Sep. 21, 2015, the contents of which are incorporated by reference herein in its entirety.

BACKGROUND OF THE INVENTION

1. Field of the Invention

This specification relates to a mobile terminal for performing a weight-based function with a military purpose, and a method for controlling the same.

2. Background of the Invention

In the existing Android environment, when an application accesses system data or uses system functions during an execution thereof, the data access and the function use is permitted or blocked according to an intent control policy or a framework function control policy.

However, only the simple permission or denial (blocking) of accessing specific data or using a system function by an application results in failing to immediately notify a blocked state to a user or completely block a use of a terminal when the access of the application has been blocked. Also, considering a special environment, namely, a military environment, it is difficult to apply different access levels to system data, system functions and intent according to roles given on the user basis and characteristics of military applications.

SUMMARY OF THE INVENTION

Therefore, to overcome those problems of the related art, an aspect of the detailed description is to execute a weight-based function using a weight for an access to system data, a use of a system function and a use of intent.

Another aspect of the detailed description is to set an access with respect to various users or applications and set multiple steps of blocking levels by providing several steps of blocking degrees when blocking an access to system data, a use of a system function and a use of intent.

To achieve these and other advantages and in accordance with the purpose of this specification, as embodied and broadly described herein, there is provided a mobile terminal for performing a weight-based function with military purposes, the terminal including an interface unit configured to receive a control policy controlling intent, and information deciding a weight for the intent, and a controller configured to determine whether or not a use authority for the intent is provided, decide a weight based on the control policy and the information when the use authority is not provided, and execute one of a log generation, an immediate notification and a terminal lock by comparing the decided weight with a preset boundary value. Multiple stages of blocking levels can be provided upon blocking the intent, which may allow for setting access and blocking with respect to various users or applications.

In one embodiment disclosed herein, the weight may be decided based on a user, a function of a system that an application uses, importance of data that the application accesses, and importance of the intent.

In one embodiment disclosed herein, the control policy, the information and the preset boundary value may be updated by a policy defining part.

In one embodiment disclosed herein, the preset boundary value may include a first boundary value, and a second boundary value greater than the first boundary value. The controller may execute the log generation when the decided weight is smaller than the first boundary value, execute the immediate notification when the decided weight is greater than the first boundary value and smaller than the second boundary value, and execute the terminal lock when the decided weight is greater than the second boundary value.

In one embodiment disclosed herein, the intent may be a function of the application.

To achieve these and other advantages and in accordance with the purpose of this specification, as embodied and broadly described herein, there is provided a method for controlling a weight-based function in a mobile terminal for military purposes, the method including a control policy receiving process of receiving a control policy controlling intent and information deciding a weight for the intent, a use authority determining process of determining whether or not a use authority for the intent is provided, a weight deciding process of deciding a weight based on the control policy and the information when the use authority is not provided, and an intent blocking process of executing one of a log generation, an immediate notification and a terminal lock by comparing the decided weight with a preset boundary value.

In one embodiment disclosed herein, the preset boundary value may include a first boundary value, and a second boundary value greater than the first boundary value. The intent blocking process may include a first comparing process of comparing the decided weight with the first boundary value, and a second comparing process of comparing the decided weight with the second boundary value when the decided weight is greater than the first boundary value.

In accordance with a technical aspect of the present invention, a weight control module may be added upon accessing system data, using a system function and using intent and multiple stages of blocking levels may be provided upon blocking the use and access, thereby allowing for setting access and blocking with respect to various users or applications.

In accordance with a military aspect of the present invention, multiple control levels with respect to an access to terminal data and an access to a terminal function and an application use control method can be provided according to a military hierarchy and a mission (role, duty), thereby effectively controlling the mobile terminal for military purposes.

In accordance with an economic aspect of the present invention, one system can be used to provide a method of controlling mobile terminals belonging to various military members, thereby reducing a system cost.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

The aforementioned features and effects of the present invention will be more obvious through the following detailed description in relation to the accompanying drawings, which will facilitate those skilled in the art to which the present invention belongs to practice the technical scope of the present invention. The present invention will have various modifications and forms, and thus specific embodiments will be illustrated in the accompanying drawings and described in detail in the text. However, the present invention will not be limited to specific embodiments, and should be construed to extend to any alterations, equivalents and substitutes in addition to those which are particularly set out in the accompanying drawings. Terms used in this specification are merely used for explaining specific embodiments, and should not be construed to limit the present invention.

The present invention proposes a mobile terminal for military purposes (or a military mobile terminal) for controlling a weight-based function, and a control method thereof.

Hereinafter, description will be given in more detail of a military mobile terminal for controlling a weight-based function, and a control method thereof, with reference to the accompanying drawings.

That is, the present invention may block a use of intent, a use of a system function and an access to system data by providing a weight according to a specific user, a function of a system that an application (App) uses, importance of data that the application accesses, and importance of data that the application accesses. To this end, the present invention provides a method of setting (designating) a different blocking level according to a level decided based on a weight upon blocking the use of the intent, the use of the system function and the access to the system data.

Figure 1:
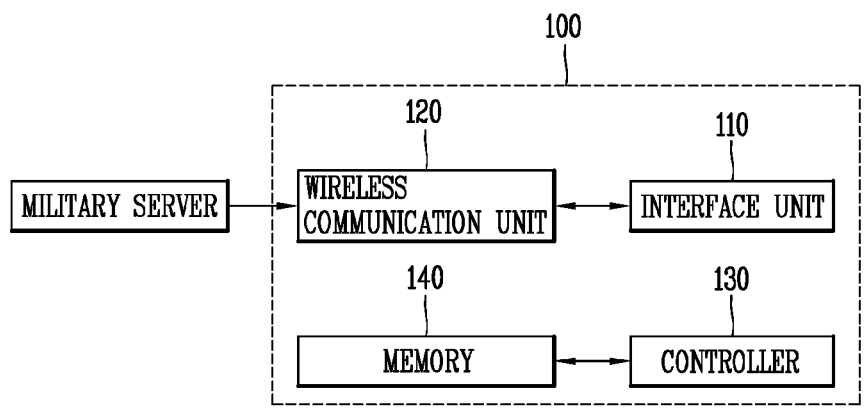
FIG. 1 is a view illustrating a detailed configuration of a mobile terminal of performing a weight-based function with military purposes according to the present invention.

FIG. 1 is a view illustrating a detailed configuration of a military mobile terminal of performing a weight-based function according to the present invention. As illustrated in FIG. 1, a military mobile terminal 100 of controlling a weight-based function includes an interface unit 110, a wireless communication unit 120, a controller 130 and a memory 140.

The interface unit 110 receives a control policy controlling intent, and information deciding a weight with respect to the intent.

The wireless communication unit 120 performs a wireless communication connection with a military server. Private and military wireless communication systems may be used for the wireless communication connection.

Meanwhile, the interface unit 110 may receive the control policy and the information deciding the weight from the military server or by accessing the memory 140.

The controller 130 determines presence or absence of an authority for using the intent, and decides a weight based on the control policy and the information when the use authority is provided. Also, the controller 130 performs one of a log generation, an immediate notification and a terminal lock by comparing the decided weight with a preset boundary value.

The memory 140 stores the control policy and the information deciding the weight. The memory 140 may also store the preset boundary value, the weight decided based on the control policy and the information, and related values.

Meanwhile, the weight may be decided based on a user, a function of a system that an application uses, importance of data that the application accesses, and importance of intent.

Also, the control policy, the information and the preset boundary value may be updated by a policy defining part. Here, the policy defining part may be implemented within the military server or the controller 130.

Hereinafter, a method of comparing the preset boundary value with the decided weight according to the present invention will be described.

The preset boundary value includes a first boundary value, and a second boundary value which is greater than the first boundary value. The controller 130 performs the log generation when the decided weight is smaller than the first boundary value. On the other hand, the controller 130 performs the immediate notification when the decided weight is greater than the first boundary value and smaller than the second boundary value. Also, the controller 130 performs the terminal lock when the decided weight is greater than the second boundary value. That is, the controller 130 performs a function with a high security level in response to an increase in a value of the decided weight.

Meanwhile, the intent is a set or group of command words performing management of a communication in an Android system, and used for a call between components and a message transmission. In addition, the intent may include a function of the application. That is, every function and procedure associated with an intent control described in the present invention can be used for functions and procedures associated with an application function control.

Hereinafter, the method of controlling the weight-based function in the military mobile terminal according to the present invention will be described in detail. Here, the function control method of the military mobile terminal includes an intent control method and an application function control method.

Figure 2:
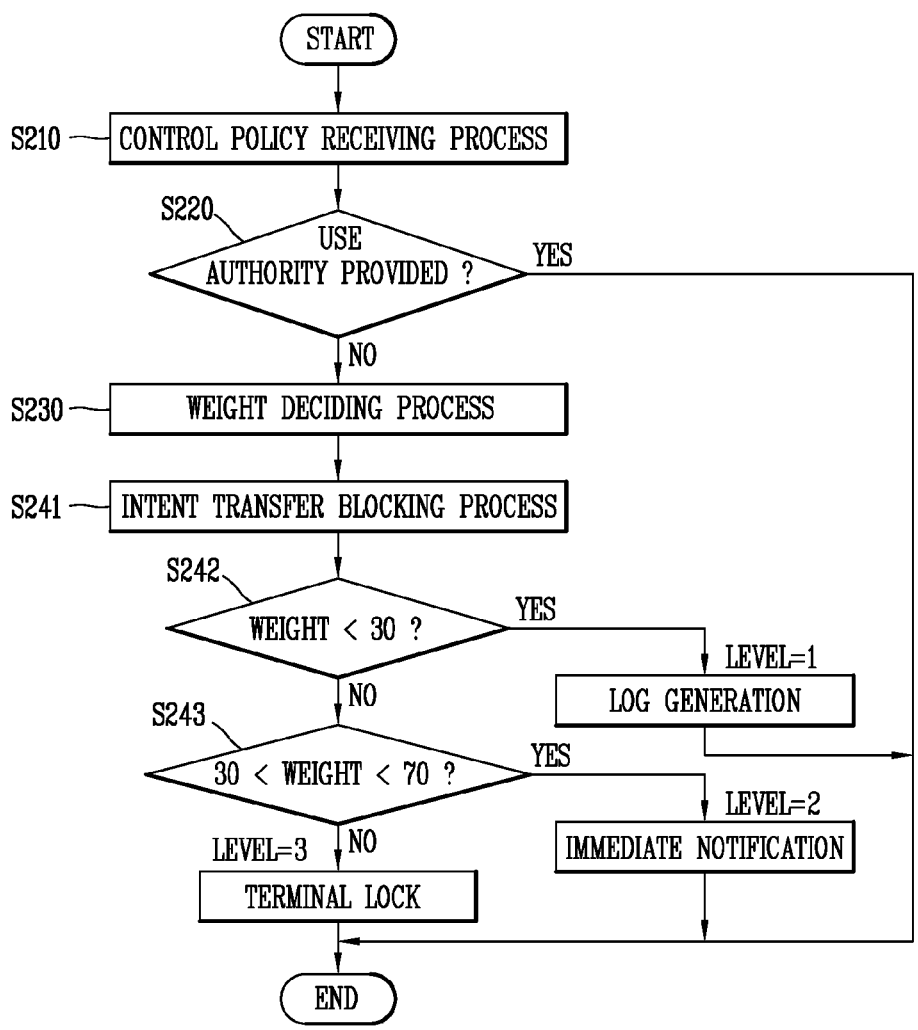
FIG. 2 is a flowchart illustrating an intent control method in a mobile terminal for military purposes according to the present invention.
Figure 3:
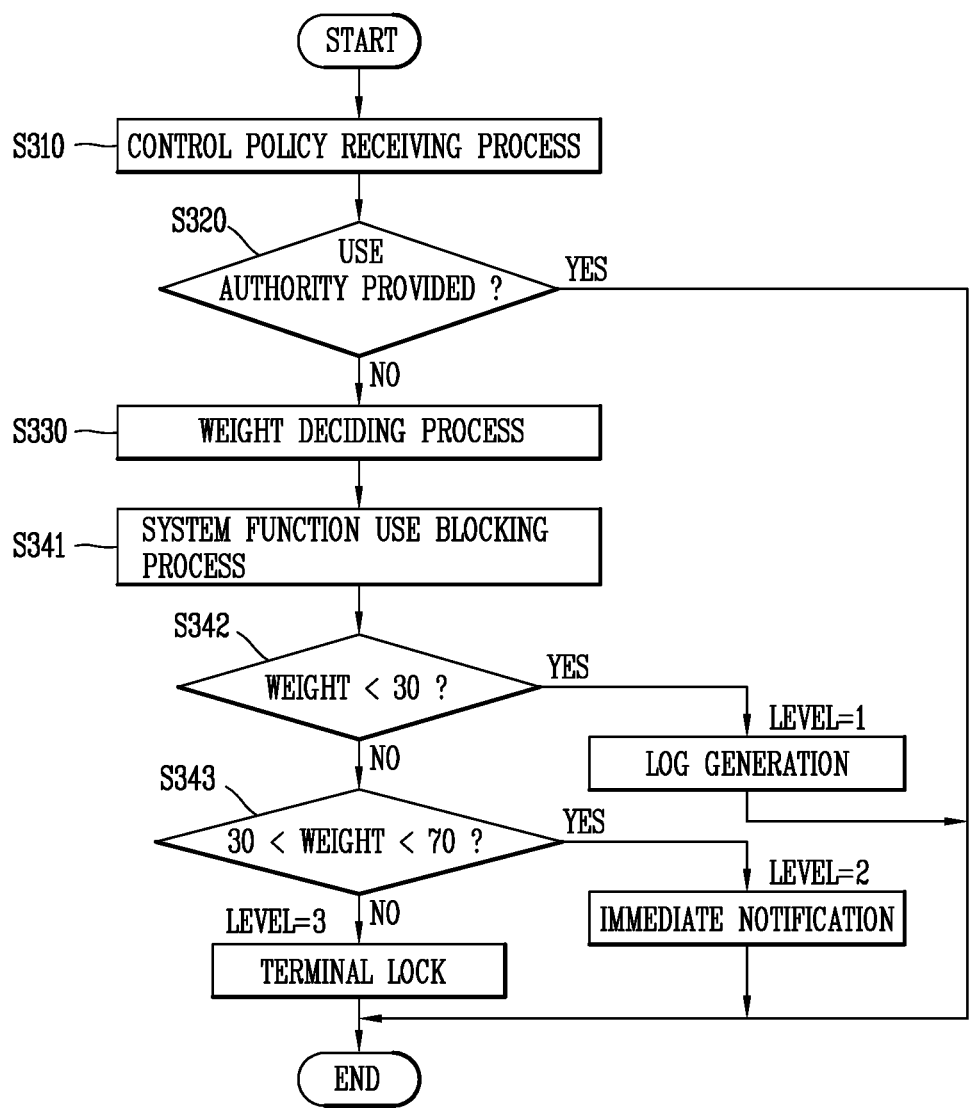
FIG. 3 is a flowchart illustrating an application function control method in a mobile terminal for military purposes according to the present invention.

In relation to this, FIG. 2 is a flowchart illustrating an intent control method in a mobile terminal for military purposes according to the present invention. Also, FIG. 3 is a flowchart illustrating an application function control method in a mobile terminal for military purposes according to the present invention.

Referring to FIG. 2, the method of controlling the weight-based function in the military mobile terminal includes a control policy receiving process (S210), a use authority determining process (S220), a weight deciding process (S230), and an intent blocking process (S240).

The control policy receiving process (S210) is configured to receive a control policy controlling intent, and information deciding a weight for the intent. In relation to this, an intent control policy to which an intent weight is applied is loaded. For example, a weight for intent of android.media.action.IMAGE_CAPTURE may be 80 and a weight for intent of android.media.action.REBOOT may be 20. The intent weights are merely illustrative and may be updated through an update process.

The use authority determining process (S220) is configured to determine whether or not a use authority for the intent is provided (present). In relation to this, an intent use authority of an application is checked when receiving or transmitting the intent. In this instance, the intent use is permitted when the application has the authority, and blocked when the application does not have the authority.

Meanwhile, when the intent use authority is not present, the following processes are performed.

The weight deciding process (S230) is configured to decide a weight based on the control policy and the information deciding the weight when the use authority is not provided. Here, the weight may be decided based on a user, a function of a system that an application uses, importance of data that the application accesses, and importance of intent. Therefore, as aforementioned, the weight for intent of android.media.action.IMAGE_CAPTURE is 80 and a weight for intent of android.media.action.REBOOT is 20, but these are weights decided according to the function of the system. Therefore, the user, the importance of the data that the application accesses and the importance of the intent may further be taken into account on the basis of the control policy and the information deciding the weight received in the control policy receiving process (S210). Accordingly, in the weight deciding process (S230), the weight may finally be decided based on the user, the function of the system that the application uses, the importance of the data that the application accesses and the importance of the intent. Meanwhile, the user can be provided with multiple (blocking) levels with respect to an access to a terminal data and an access to a terminal function, and an application use control method according to a military hierarchy and a mission (role, duty) of the user.

The intent blocking process (S240) is configured to execute one of a log generation, an immediate notification and a terminal lock by comparing the decided weight with a preset boundary value.

Meanwhile, the intent blocking process (S240) includes an intent transfer blocking process (S241), a first comparing process (S242), and a second comparing process (S243).

The intent transfer blocking process (S241) blocks a function of transferring the intent when the use authority is not provided according to the determination as to the presence or absence of the use authority with respect to the intent. Meanwhile, the intent transfer blocking process (S241) may also be executed prior to executing the weight deciding process (S230). That is, without the use authority, the weight deciding process (S230) may be executed after executing the intent transfer blocking process (S241).

Meanwhile, an action to be taken later, such as a blocking level, with respect to the transfer-blocked intent may be decided on the basis of the weight. That is, a simple log generation, an immediate notification to the user, or complete blocking for a terminal use may be executed according to the blocking level. In this instance, importance of intent blocked in the system is high when the weight is high, and accordingly importance of data or a function accessed by the blocked intent becomes high.

In relation to this, the first comparing process (S242) is configured to compare the decided weight with the first boundary value. For example, the first boundary value may be 30. When the decided weight is smaller than the first boundary value, the simple log generation with respect to blocking the intent is executed.

Meanwhile, when the decided weight is greater than the first boundary value, the second comparing process (S243) is executed. That is, the second comparing process (S243) is configured to compare the decided weight with the second boundary value when the decided weight is greater than the first boundary value. For example, the second boundary value may be 70.

Accordingly, when the decided weight is greater than the first boundary value and smaller than the second boundary value, the immediate notification for the intent blocking is executed. On the other hand, when the decided weight is greater than the second boundary value, the terminal lock for restricting the use of the terminal is executed.

Meanwhile, referring to FIG. 3, the application function control method of the military mobile terminal includes a control policy receiving process (S310), a use authority determining process (S320), a weight deciding process (S330), and an application function blocking process (S340).

The control policy receiving process (S310) is configured to receive a control policy controlling an application function, and information deciding a weight for the application function. For example, an application function weight of location information may be 20, and an application function weight of reading/writing address book data. The application function control weights are merely illustrative and may be updated through an updating process.

The use authority determining process (S320) is configured to determine whether or not the application has a use authority for a system function. That is, when the application uses a system function or accesses system data, the use authority of the application is checked. The use is permitted when the application has the use authority according to the check result, and blocked when the application does not have the authority.

The weight deciding process (S330) is configured to decide a weight based on the application function control policy and the information deciding the weight when the application is not provided with the use authority. Here, the weight may be decided based on a user, a function of a system that the application uses, importance of data that the application accesses, and importance of the intent. Therefore, as aforementioned, the application function weight of the location information is 20 and the application function weight of reading/writing the address book data is 80, but these are weights decided according to the function of the system. Therefore, the user and the importance of the data that the application accesses may further be taken into account on the basis of the control policy and the information deciding the weight which have been received in the control policy receiving process (S210). Accordingly, in the weight deciding process (S330), the weight may finally be decided based on the user, the function of the system that the application uses, the importance of the data that the application accesses and the importance of the intent. Meanwhile, the user may be provided with multiple (blocking) levels with respect to an access to a terminal data and an access to a terminal function, and an application use control method according to a military hierarchy and a mission (role, duty) of the user.

The application function blocking process (S340) is configured to execute one of a log generation, an immediate notification and a terminal lock by comparing the decided weight with a preset boundary value.

Meanwhile, the application function blocking process (S340) includes a system function use blocking process (S341), a first comparing process (S342) and a second comparing process (S343).

The system function use blocking process (S341) is configured to block the use of the system function when the application is not provided with the use authority according to the determination result as to the presence or absence of the use authority for the system function. Meanwhile, the system function use blocking process (S341) may also be executed prior to executing the weight deciding process (S330). That is, without the use authority, the weight deciding process (S330) may be executed after executing the system function use blocking process (S341).

Meanwhile, an action to be taken later, such as a blocking level, with respect to the use of the system function and the access to the system data which have been blocked may be decided on the basis of the weight. That is, blocking levels of the use of the system function and the access to the system data in the blocked state are decided based on the weight. That is, a simple log generation, an immediate notification to the user, or complete blocking of a terminal use may be executed according to the blocking level. In this instance, importance of the system function and the system data which are blocked in the system is high when the blocking level is high.

In relation to this, the first comparing process (S342) is configured to compare the decided weight with the first boundary value. For example, the first boundary value may be 30. When the decided weight is smaller than the first boundary value, the simple log generation is executed for the blocking of the use of the system function and the access to the system data.

On the other hand, when the decided weight is greater than the first boundary value, the second comparing process (S343) is executed. That is, the second comparing process (S343) is configured to compare the decided weight with the second boundary value when the decided weight is greater than the first boundary value. For example, the second boundary value may be 70.

Accordingly, when the decided weight is greater than the first boundary value and smaller than the second boundary value, the immediate notification of the blocking of the use of the system function and the access to the system data is executed. On the other hand, when the decided weight is greater than the second boundary value, the terminal lock for restricting the use of the terminal is executed.

According to the aforementioned embodiments of the present invention, multiple stages of blocking levels may be provided according to a weight upon a system data access, the system function use and the intent use, which may allow for setting access and blocking with respect to various users or applications.

Also, according to the embodiments of the present invention, multiple control levels with respect to an access to terminal data and an access to a terminal function and an application use control method can be provided according to a military hierarchy and a mission (role, duty), thereby effectively controlling the mobile terminal for military purposes.

Also, according to the embodiments of the present invention, one system can be used to provide a method of controlling mobile terminals belonging to various military members, thereby reducing a system cost.

Meanwhile, the aforementioned configurations of the mobile terminal for controlling an access to data for military operations and the method of controlling an access to data for military operations can be combined with each other for use.

Meanwhile, the controller 130 disclosed herein may be implemented by hardware, software and a combination thereof. Also, a detailed constructing module may be implemented by hardware, software and a combination thereof.

For software configuration, components, as well as procedures and functions described in this specification, can also be implemented as separate software modules. Each of the software modules may execute one or more functions and operations described in the specification. Software codes can be implemented as software applications written in an appropriate program language. The software codes may be stored in the memory, and executed by the controller or a processor.

What is claimed is:

1. A mobile terminal for performing a weight-based function with military purposes, the terminal comprising:
    an interface unit configured to receive; a control policy controlling intent, and information deciding a weight for the intent; and
    a controller configured to determine whether or not a use authority for the intent is provided, decide a weight based on the control policy and the information when the use authority is not provided, and execute one of a log generation, an immediate notification and a terminal lock by comparing the decided weight with a preset boundary value,
    wherein the weight includes a user weight, an application function weight, data importance weight and an intent importance weight that are decided on the basis of the user, a function of a system that a plurality of applications use, importance of data that the applications access, and importance of the intent, respectively,
    wherein the user weight includes the user's military class and duty,
    wherein the controller executes one of the log generation, the immediate notification and the terminal lock on the basis of the user weight, the application function weight, the data importance weight and the intent importance weight when the use authority is not provided, and
    wherein the application function weight includes a first application function weight with respect to a function of a first application, and a second application function weight with respect to a function of a second application different from the first application, and
    wherein the first application function weight and the second application function weight are updated through an update process to generate an updated first application function weight and an updated second application function weight, wherein the updated first application function weight and the updated second application function weight are used by the controller to execute one of the log generation, the immediate notification and the terminal lock on the basis of the user weight in an upcoming operation of the terminal for performing a weight-based function.

2. The terminal of claim 1, wherein the control policy, the information and the preset boundary value are updated by a policy defining part.

3. The terminal of claim 1, wherein the preset boundary value includes a first boundary value, and a second boundary value greater than the first boundary value, and
    wherein the controller executes the log generation when the decided weight is smaller than the first boundary value,
    executes the immediate notification when the decided weight is greater than the first boundary value and smaller than the second boundary value, and executes the terminal lock when the decided weight is greater than the second boundary value.

4. The terminal of claim 1, wherein the intent is a function of the applications.

5. A method for controlling a weight-based function in a mobile terminal for military purposes, the method comprising:
   a control policy receiving process of receiving a control policy controlling intent and information deciding a weight for the intent;
   a use authority determining process of determining whether or not a use authority for the intent is provided;
   a weight deciding process of deciding a weight based on the control policy and the information when the use authority is not provided; and
   an intent blocking process of executing one of a log generation, an immediate notification and a terminal lock by comparing the decided weight with a preset boundary value,
   wherein the weight includes a user weight, an application function weight, a data importance weight and an intent importance weight that are decided on the basis of the user, a function of a system that a plurality of applications use, importance of data that the applications access, and importance of the intent, respectively,
   wherein the user weight includes the user's military class and duty,
   wherein the intent blocking process is configured to execute one of the log generation, the immediate notification and the terminal lock on the basis of the user weight, the application function weight, the data importance weight and the intent importance weight when the use authority is not provided,
   wherein the application function weight includes a first application function weight with respect to a function of a first application, and a second application function weight with respect to a function of a second application different from the first application, and
   wherein the first application function weight and the second application function weight are updated through an update process to generate an updated first application function weight and an updated second application function weight, wherein the updated first application function weight and the updated second application function weight are used by the controller to execute one of the log generation, the immediate notification and the terminal lock on the basis of the user weight in an upcoming operation of the terminal for performing a weight-based function.

6. The method of claim 5, wherein the preset boundary value includes a first boundary value, and a second boundary value greater than the first boundary value, and
   wherein the intent blocking process comprises:
   a first comparing process of comparing the decided weight with the first boundary value; and
   a second comparing process of comparing the decided weight with the second boundary value when the decided weight is greater than the first boundary value.

* * * * *